United States Patent
Graef

[19]

[11] Patent Number: 6,101,329
[45] Date of Patent: Aug. 8, 2000

[54] SYSTEM FOR COMPARING COUNTER BLOCKS AND FLAG REGISTERS TO DETERMINE WHETHER FIFO BUFFER CAN SEND OR RECEIVE DATA

[75] Inventor: Stefan Graef, Milpitas, Calif.

[73] Assignee: LSI Logic Corporation, Milpitas, Calif.

[21] Appl. No.: 08/801,630

[22] Filed: Feb. 18, 1997

[51] Int. Cl.[7] ............................................. G06F 13/36
[52] U.S. Cl. .................... 395/872; 395/849; 395/875; 395/877; 395/878; 365/221
[58] Field of Search ........................ 707/7; 364/578, 364/528.13; 395/877, 202.8, 849, 875, 878, 872; 377/34; 365/221, 73

[56] References Cited

U.S. PATENT DOCUMENTS

| | | | |
|---|---|---|---|
| 4,030,078 | 6/1977 | Kluge | 707/7 |
| 4,085,438 | 4/1978 | Butler | 364/528.13 |
| 4,175,287 | 11/1979 | Fuhrman | 364/900 |
| 5,053,980 | 10/1991 | Kanazawa | 364/578 |
| 5,084,841 | 1/1992 | Williams et al. | 365/189 |
| 5,249,271 | 9/1993 | Hopkinson et al. | 395/877 |
| 5,305,253 | 4/1994 | Ward | 365/73 |
| 5,365,485 | 11/1994 | Ward et al. | 365/221 |
| 5,384,744 | 1/1995 | Lee | 365/221 |
| 5,404,452 | 4/1995 | Detschel et al. | |
| 5,448,606 | 9/1995 | Snelgrove | 377/34 |
| 5,513,224 | 4/1996 | Holt | |
| 5,557,575 | 9/1996 | Lee | 365/221 |
| 5,712,992 | 1/1998 | Hawkins et al. | 395/877 |
| 5,758,075 | 5/1998 | Graziano et al. | 395/200.8 |
| 5,802,052 | 9/1998 | Venkataraman | 370/395 |

FOREIGN PATENT DOCUMENTS 0 507 571 A2  4/1992  European Pat. Off. .......... G06F 5/06

*Primary Examiner*—Thomas C. Lee
*Assistant Examiner*—Michael G. Smith

[57] ABSTRACT

According to the current invention, there is provided a system for transferring data into and out of a first-in, first-out (FIFO) data buffer. The buffer has a read pointer and a write pointer. The system comprises a comparator circuit, multiple counter blocks, and multiple flag registers. The counter blocks and flag registers are connected to a system clock to provide timing information and capacity indications to the comparator. The comparator circuit continuously monitors the multiple counter blocks, thereby tracking buffer pointer positions. The flag registers indicate relative buffer capacity and provide early indication to the system that the buffer is almost full or almost empty in appropriate conditions. The comparator circuit continuously evaluates the read and write counter blocks and the flag registers to determine the ability of the buffer to accept or transmit data.

25 Claims, 2 Drawing Sheets

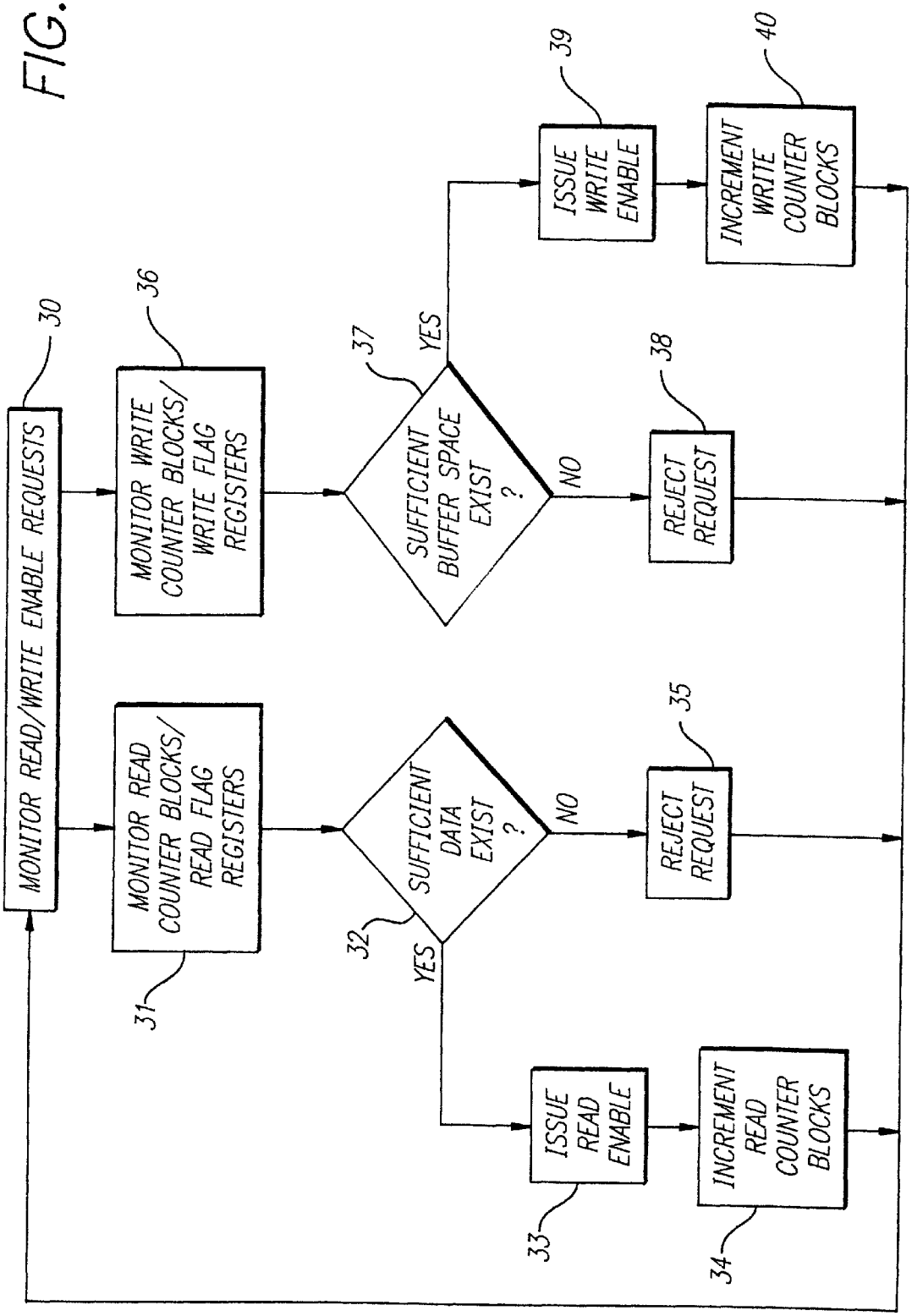

SYSTEM FOR COMPARING COUNTER BLOCKS AND FLAG REGISTERS TO DETERMINE WHETHER FIFO BUFFER CAN SEND OR RECEIVE DATA

BACKGROUND OF THE INVENTION

1. Field of the Invention

This invention relates generally to electronic circuits and more particularly to data buffering of signals between two clock domains using a First In, First Out (FIFO) hierarchy.

2. Description of the Related Art

Many data processing and communication devices, such as computer networks, require communication between elements operating at different frequencies. One problem with such asynchronous communication is that data transmission between the data write element and the data read element must be controlled carefully to prevent data loss or spurious transfers. If the data write element transmits data faster than the data read element can receive, information may be lost. Alternately, if the data receive element accepts information faster than the data write element can transmit, the same data may be received twice.

A First In, First Out (FIFO) buffer is commonly used between such elements. During operation of a FIFO, a first component writes data to the FIFO buffer and a second component reads from the FIFO buffer. Each component reads or writes according to its own clock frequency. As two separate components with separate frequencies control read and write operation timing, the buffer is operated in an asynchronous manner, and time separation between read and write operations may be very short.

The problem between in buffering data is that buffers have finite size. If the data write element operates faster than the data read element for an extended period of time, the buffer may overflow, thereby causing data loss. If the data read element operates at a faster rate, the buffer may empty and the data read element may receive invalid data.

It is difficult to regulate the fill status of the data buffer and compensate for data loss and spurious transmission problems. A need therefore exists to monitor and maintain the fill status of the FIFO buffer in a manner that minimizes errors common in asynchronous systems.

It is therefore an object of the current invention to provide a reliable system for transmitting data at an asynchronous rate by minimizing data loss and spurious data transmissions.

It is another object of the current invention to improve the traditional data buffering FIFO scheme by providing a system which is stable and fill status flags which are reliable.

SUMMARY OF THE INVENTION

According to the current invention, there is provided a system for transferring data into and out of a first-in, first-out data buffer having at least one buffer pointer associated therewith. The buffer pointers typically comprise a read buffer pointer and a write buffer pointer.

The system comprises a comparator circuit, multiple counter blocks, and multiple flag registers. The counter blocks and flag registers are connected to a system clock to provide timing information and capacity indications to the comparators.

The counter blocks comprise multiple read counter blocks and multiple write counter blocks. The read counter blocks interact with a read clock, an almost empty flag register, and an empty flag register. The write counter blocks interact with a write clock, an almost full flag register, and a full flag register.

The comparator circuit continuously monitors the multiple counter blocks, thereby tracking pointer positions. The flag registers indicate relative buffer capacity and provide early indication to the system that the buffer is almost full or almost empty in appropriate conditions.

The comparator circuit continuously evaluates the read and write counter blocks and the flag registers to determine the ability of the buffer to accept or transmit data.

The flag registers are each made up of a gray counter which changes only one digit for each change of state.

The counter blocks include one primary counter block which tracks the appropriate buffer pointer and at least one secondary counter block which tracks data at a predetermined time offset from the buffer pointer. During operation and in the preferred embodiment, the primary counter block tracks the appropriate pointer, while the secondary counter blocks comprise two counter blocks tracking one clock cycle and two clock cycles ahead of the pointer. For example, the write counter blocks comprise a primary write counter block which tracks the pointer, and two secondary counter blocks, one which tracks the write pointer plus one frame and one which tracks the write pointer plus two frames. Greater or fewer counter blocks may be used while still within the scope of the invention.

During operation, the comparator receives an enable request, i.e. a read enable request or a write enable request, and must evaluate the state of the buffer to determine whether to honor, or pass along, the request. The comparator thus continuously monitors the counter blocks and the flag registers to determine the state of the buffer. On receiving a write enable request, the comparator monitors the write counter blocks and the full and almost full flag registers to determine whether the buffer is full or almost full. If either the full or the almost full flag is not set, the comparator issues the write enable and increments the three write counter block locations. If the buffer is full and the full data register is set, the comparator denies the request. If the almost full flag is set, the system issues the write request and increments the counters by one.

The comparator is simultaneously monitoring the relative positions of the read and write counter blocks and the buffer capacity. If the buffer size (B) is greater than or equal to the secondary write counter block (W+2), the "almost full" flag register is set. If the buffer size B is equal to the primary write counter block (W) and the "almost full" flag is set, then the "full" flag is set. On setting the full flag, as indicated, the write enable request is blocked. A similar arrangement occurs for the read counter blocks. The comparator continues to monitor the fill status and removes or sets low the full flag register when the buffer is no longer full but may be almost full, and the same for the empty indication. The comparator therefore necessarily constantly interacts with and monitors the read and write requests, the read and write counter blocks, and the flag registers to adequately issue read and write requests when appropriate.

The counter blocks are highly balanced to ensure short setup time for the comparator. The flag registers are synchronized through a flip-flop which ensures a minimal time window for transferring data.

Other objects, features, and advantages of the present invention will become more apparent from a consideration of the following detailed description and from the accompanying drawings.

DESCRIPTION OF THE DRAWINGS

FIG. 2 is a flow diagram of the operation of the comparator as used with the invention.

DETAILED DESCRIPTION OF THE INVENTION

Figure 1:
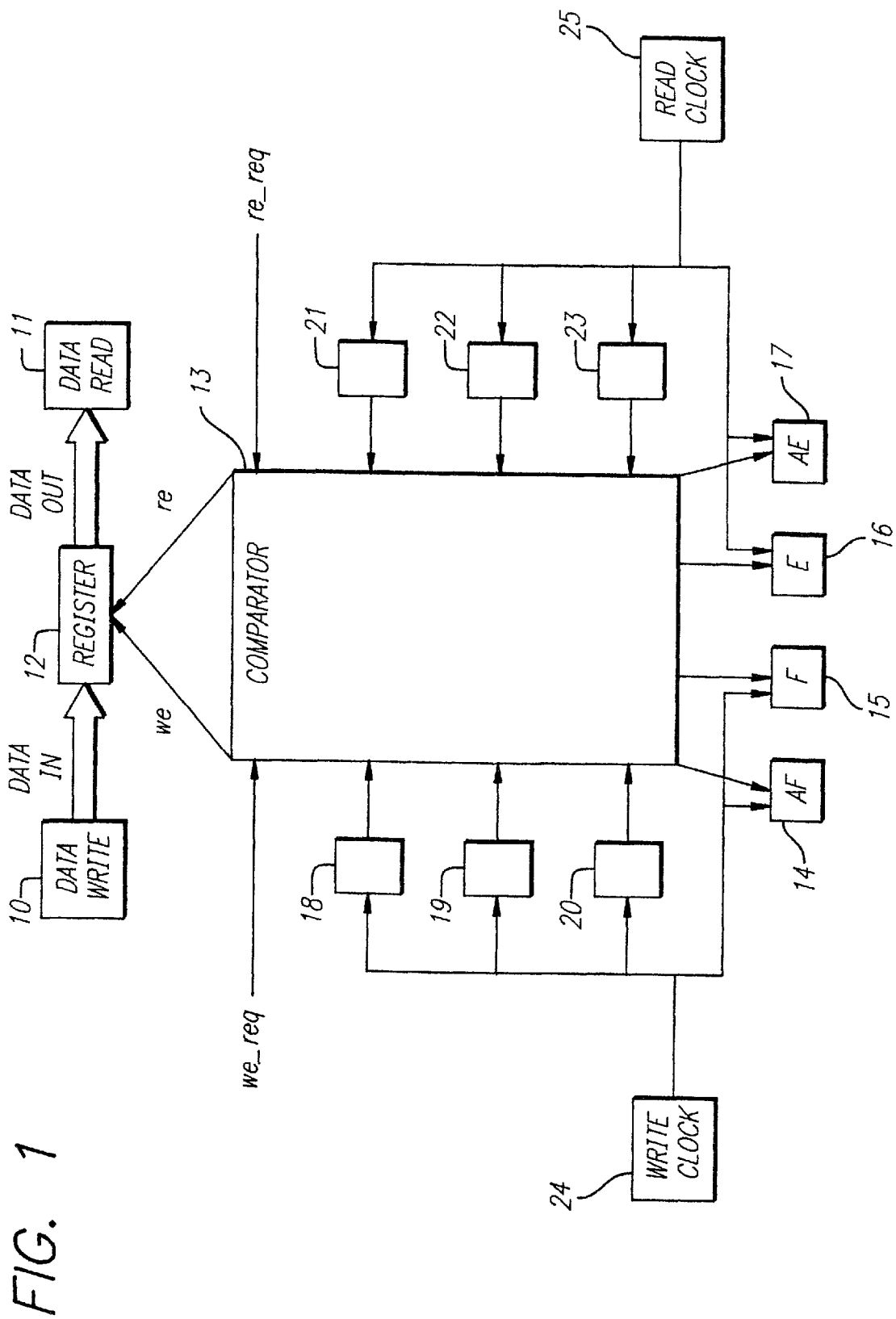
FIG. 1 illustrates the FIFO data buffering arrangement in accordance with the invention.

FIG. 1 illustrates the FIFO buffering arrangement according to the present invention. Data write element 10, or the transmitting device, writes data at a first data rate. Data read element 11, or the receiving device, reads data at a second data rate. No requirement exists such that the data write element 10 and data read element 11 operate at different rates, but the invention disclosed herein is particularly suited to asynchronous operation, i.e. the first data rate and the second data rate differ.

Register 12 buffers data between the data write element 10 and the data read element 11. Comparator 13 transmits write-enable (we) and read enable (re) indications to buffer register 12 under appropriate conditions, as described below.

Buffer register 12 may comprise multiple flip-flops, or a random access memory (RAM), data registers, or other data receiving and transmitting device or algorithm.

The comparator 13 receives read enable and write enable indications from other system functions and locations. On receiving a read enable request or write enable request, the comparator 13 evaluates the series of flag registers and clock locations and determines if a read or write function should occur. Read enable and write enable requests may come from various sources, including but not limited to predetermined numbers of system clock cycles, system read components, or system write components.

In the preferred embodiment, the comparator 13 monitors four flag registers, almost full flag register 14, full flag register 15, empty flag register 16, and almost empty flag register 17. First write counter block 18, second write counter block 19, and third write counter block 20, as well as first read counter block 21, second read counter block 22, and third read counter block 23 interact with both the comparator 13 and the four flag registers 14, 15, 16, and 17. As may be appreciated, more or fewer data counter blocks may be used while still within the scope of the invention. It has been determined that two sets of three data blocks provide adequate buffering performance for systems having varying clock speeds and for buffers of various sizes used in computers and other electronic devices.

The first write counter block 18, also called the primary write counter block, counts where the next writing process would take place, and thus counts the actual location of the write pointer, designated as W for simplicity. This determination, as illustrated in FIG. 1, is performed in conjunction with the write clock 24. The next write counter block has a one unit offset, so the second write counter block 19 will always counts one write clock cycle, or one digit ahead of the first write counter block 18. The second write counter block thus maintains the location of the write pointer plus one (W+1). The third write counter always counts two digits ahead, and thus maintains the location of the write pointer plus two digits (W+2). The second and third write counter blocks are secondary write counter blocks.

The read counter blocks operate in essentially the same manner, with the first read counter block 21, or primary read counter block, counting or tracking the actual location of the read pointer, R. The read counter blocks operate in connection with the read clock 25. The second read counter block 22 maintains a one read clock cycle offset, counting one digit ahead of the first read counter block, or (R+1). The third read counter block 23 always counts two locations ahead, and thus maintains the location of the read pointer plus two, or (R+2). The second and third read counter blocks 22 and 23 are secondary read counter blocks.

During operation, the comparator 13 monitors the third write counter block 20, equal to the write pointer plus two (W+2) while also monitoring the maximum capacity of the buffer, or B. If comparator 13 determines the buffer capacity B is at a position greater than or equal to the write pointer plus two, or B is greater than or equal to W+2, the almost full flag register 14 is set to indicate that the FIFO is almost full. If the comparator 13 determines that the buffer capacity location and write pointer location are equal, or B equals W, and the almost full flag register 14 is set, the full flag register 15 is set indicating the FIFO is full, and the almost full flag register 14 may be set false. Resetting the almost full flag register 14 is optional on setting the full flag register, as once the full flag register is no longer true, i.e. the read pointer and write pointer locations are no longer equal, the full flag register 15 is set false and the almost full flag register is set true. On setting the full flag register 15, all write enable requests are blocked, i.e. the comparator 13 does not respond to a write enable request. This procedure is further detailed by example below.

Conversely, the comparator 13 monitors the third read counter block 23, equal to the read pointer plus two (R+2), while concurrently monitoring the first write counter block 18, or location of the write pointer, W. If comparator 13 determines the write pointer is positioned less than or equal to the read pointer plus two, or W is less than or equal to R+2, the almost empty flag register 17 is set to indicate that the FIFO buffer register 12 is almost empty. If the comparator 13 determines that the read pointer location and write pointer location are equal, and the almost empty flag register 17 is set, the empty flag register 16 is then set indicating the FIFO contains no more data. On setting the empty flag register 16, all read enable requests are blocked, i.e. the comparator 13 will not respond to a read enable request. Again, as with the full setting on the write side, on setting the empty flag register 16, the almost empty flag register 17 is preferably set low, but may optionally remain high. Once the comparator 13 determines the FIFO buffer register 12 is no longer empty, the empty flag register 16 is set false and the almost empty flag register 17 is set true.

Accordingly, the comparator 13 receiving a read enable request is only able to change the elements on the right side of FIG. 1, i.e. first read counter block 21, second read counter block 22, third read counter block 23, almost empty flag register 17, and empty flag register 16. A write enable request requires the comparator 13 to change the elements on the left side of FIG. 1, i.e. first write counter block 18, second write counter block 19, third write counter block 20, almost full flag register 14, and full flag register 15. The comparator 13 must monitor all these elements, but only alters those based on the specific request received.

On receiving and granting an enable request, the comparator 13 either indicates to the register 12 that a read enable or a write enable must occur, and each of the counter blocks for the appropriate enable are incremented. For example, if a write enable is requested, the comparator 13 evaluates the current state of the flag registers 14, 15, 16, and 17 and determines that a write enable is proper, then the write enable is indicated from the comparator 13 to the register 12 and all of the write flag counter blocks 18, 19, and 20 are incremented by one. In such a case, the first write counter block 18 maintains the position W'=W+1, the second write counter block 19 the position W'+1=W+2, and the third write counter block 20 the position W'+2=W+3. Thus each counter block is incremented by one pointer location, and the same occurs for read counter blocks on receiving and transmitting a read enable indication.

The system must maintain addressing normally required for FIFO registers, and for example write enable indications transmitted by the comparator 13 must operate to write data out from the proper addressed location in the register.

This multiple flag register arrangement results in minimizing slight timing variations, i.e. where read and write signals are separated by a very short time span the arrangement disclosed provides a means for the comparator 13 to monitor and determine read enable, write enable, and FIFO register activity with the knowledge of the current state and proximity of read and write pointers.

Use of the flag register arrangement also saves the comparator 13 the time required to perform an addition, which is typically required of an asynchronous FIFO design. The time saved in performing the addition is used to monitor FIFO activity and act on read enable or write enable signals appropriately.

These almost full and almost empty flag registers 14 and 17 as well as the full and empty flag registers 15 and 16 are gray counters which inherently minimize the uncertainty of the comparator 13 and prevent spurious read enable and write enable requests, and as a result honors all timely valid enable requests. These gray counters provide a change of one bit for a single digit, i.e. only one binary digit flips for each increment in data. Gray counters are generally known to those of ordinary skill in the art, and provide a shorter settling time for the circuitry used in the comparator 13. As a result, the comparator 13 toggles less pins in its circuitry and can ultimately settle with fewer data spikes. The flag registers provide a minimal time for comparator 13 setup and provides a very reliable flagging arrangement.

To further ensure a short setup time for the comparator 13, the read clock and write clock lines to the counters must be highly balanced, i.e. have minimal skew.

As may be appreciated, several of the tasks performed by the comparator 13 are operating in parallel and are illustrated in FIG. 2. From FIG. 2, the comparator 13 monitors read enable requests in read enable evaluation step 30. On receiving a read enable request, the comparator 13 evaluates or monitors the states of all read counter blocks and associated flag registers in read counter block monitor step 31. The comparator 13 then determines whether sufficient data exists in buffer register 12 to satisfy the read request in step 32. If sufficient data exists in the buffer register 12, the comparator 13 indicates the read request is justified, issues the read enable indication in step 33, and increments the read counter blocks in step 34. If sufficient data does not exist as determined in step 32, the comparator 13 rejects the read request in step 35 and proceeds to monitor for further read/write enable requests in step 30.

A similar comparator procedure occurs concurrently for write requests as shown in FIG. 2. The comparator 13 continuously monitors for write enable requests in step 30. On receiving a write enable request, the comparator 13 evaluates the states of the write counter blocks and the write flag registers, i.e. the full and almost full flag registers, in write counter block/write flag register monitor step 36. The comparator 13 evaluates in data write evaluation step 37 whether sufficient buffer space exists to satisfy the write enable request. If sufficient space does exist in the buffer register 12 and all of the flag registers indicate that writing is permissible, the comparator 13 issues the write enable in step 39. The comparator 13 subsequently increments the write counters in step 40. If sufficient space does not exist in step 37, the comparator 13 rejects the write request in deny write request step 38 and proceeds to step 30 to monitor for write requests.

Operation of the buffering system occurs as follows. The buffer is initially empty, indicating that the read pointer and the write pointer are at the current locations, and the empty flag register is set high. On receiving a read request, the comparator 13 monitors the flags and the counter blocks to determine whether a read request may be enabled. The comparator 13 determines the empty flag is set, indicating no data is available, and thus denies the request. On receiving a subsequent write indication, the comparator 13 again evaluates the current state of the blocks and the flags. Neither the full nor the almost full flag is set, and therefore the write request is granted, and thus each write block is incremented by one frame, setting W'=W+1, (W+1)'=W+2, and (W+2)'=W+3. The empty flag register is set low and the almost empty flag register is set high. Another write indication moves the write blocks forward again, and the system then monitors the read flags and the write flags. On receiving the second write enable request, the value of the read pointer R and the write plus two (W+2) pointer are equal. The almost empty flag register changes state when the two become equal, here going from high to low. The preferred method for monitoring and changing the almost empty and almost full flag registers is to monitor the enable requests, and on the enable being granted and the appropriate write or read counter blocks incrementing, the comparison of the read and write pointers occurs to determine whether the register has changed to the almost full or the almost empty state, or R has become equal to W+2, or W has become equal to R+2. If this condition has occurred, then the almost full or almost empty flag register is set high.

For purposes of the example, the "almost empty" flag has been set false as a result of the last write enable transmitted by the comparator. On the comparator 13 receiving a read enable request, the comparator 13 evaluates the flag registers, which indicate that none of the conditions are true, and issues the read request. The issuance of the read request triggers the read counter blocks to increment by one, and comparison is made to determine whether the almost empty flag register should be set. In this case, the available data has been decreased by one and the pointer decreased by one, and thus the comparison to determine whether the read counter is less than or equal to the write counter plus two goes true. Operation continues, and under normal conditions several write requests can occur providing neither a full, almost full, empty, or almost empty indication.

The condition of the buffer is critical to filling the buffer and transmitting indication thereof. All buffers are of finite size, meaning that only a particular amount of data may be written to the buffer before it is full or, in this situation, almost full. Here, the buffer is considered almost full when the buffer can accommodate only two more data write enable commands. Thus, rather than monitoring the read side of the buffer monitoring configuration, the comparator 13 must monitor the write requests and compare the write pointer against the maximum size of the buffer. When the write enable request received by the comparator provides the comparator with information that the pointer is two write requests from the maximum buffer space, or B, the almost full register is set high, and the write counter blocks incremented. On receiving another write enable, the comparator finds the almost full indicator set and increments the counter blocks by one. The next write enable fills the buffer, and the comparison between pointer location permits the write enable and changes the almost full flag register to low and the full flag register to high. Subsequent read enable requests are honored, but write enable requests denied. As noted above, the comparator tracks the buffer capacity and the data in the buffer, or compares W, W+1, and W+2 to B.

The four flag registers are synchronized through a flip-flop which assures a minimal time window where metastability can occur. Each flag register flip flop operates by monitoring the active clock edge and providing a window around the clock edge to ensure that data is not altered during the window and assure stable results at the output. The width of the window varies depending on the layout of the flip-flop transistors, and the window width is minimized to provide the greatest stability. Circuitry for the flip-flop therefore provides sufficient time windowing for the system design to preclude unnecessary data changes at the leading clock edge, while simultaneously not restricting significant flag register operating periods.

The critical aspect of the current invention, as may be determined from the example given above, the use of gray counters for flag registers, and the tuning of the flip flops to maximize timing usage is to efficiently enhance the ability of the comparator to assess the current state of the buffer and to act accordingly. Through the arrangement disclosed herein, minimal time is required to transfer data and evaluate the current conditions and change states, thereby providing maximum ability to address asynchronous clock operation, asynchronous data requests, and asynchronous data transfers for high speed data transfer. The invention disclosed herein thus provides rapid data transfer and FIFO operation between clock domains under stable transfer conditions.

While the invention has been described in connection with specific embodiments thereof, it will be understood that the invention is capable of further modifications. This application is intended to cover any variations, uses or adaptations of the invention following, in general, the principles of the invention, and including such departures from the present disclosure as come within known and customary practice within the art to which the invention pertains.

I claim:

1. A system for transferring data into and out of a first-in, first-out data buffer having at least one buffer pointer associated therewith, comprising:
   a comparator circuit;
   a plurality of counter blocks for tracking pointer positions; and
   a plurality of flag registers indicating relative buffer capacity;
   wherein said comparator circuit evaluates said counter blocks and said flag registers to determine the ability of the buffer to accept or transmit data.

2. The system of claim 1, wherein said data buffer operates to transfer data between two asynchronous devices.

3. The system of claim 1, wherein said plurality of flag registers comprises an absolute capacity register and a proximate capacity register.

4. The system of claim 3, wherein said plurality of flag registers comprises:
   a full flag register;
   an almost full flag register;
   an almost empty flag register; and
   an empty flag register.

5. The system of claim 1, wherein said flag registers comprise a plurality of gray counters.

6. The system of claim 1, wherein said counter blocks comprise:
   a plurality of read counter blocks; and
   a plurality of write counter blocks.

7. The system of claim 6, wherein said read counter blocks comprise:
   one primary counter block which tracks a buffer read pointer; and
   at least one secondary counter block which tracks data a predetermined time offset from said buffer read pointer.

8. The system of claim 7, wherein said write counter blocks comprise:
   one primary counter block which tracks a buffer write pointer; and
   at least one secondary counter block which tracks data a predetermined time offset from said buffer write pointer.

9. The system of claim 1, further comprising:
   a clock connected to said counter blocks and said flag registers.

10. A method for evaluating data transfer requests and transferring data between two devices via a data buffer, comprising the steps of:
    monitoring a plurality of flag registers indicating data buffer fill status while simultaneously monitoring a plurality of counter blocks; and
    passing the data transfer request when said flag registers and said counter blocks indicate data is available for transfer.

11. The method of claim 10, wherein said monitoring step further comprises tracking the buffer fill status with said counter blocks using at least one pointer.

12. The method of claim 10, wherein said data buffer fill status comprises absolute and proximately absolute fill indications.

13. The method of claim 12, further comprising the step of setting a proximately absolute fill indicator when said counter blocks indicate the buffer will reach absolute fill capacity a predetermined time ahead of current pointer position.

14. The method of claim 13, wherein:
    absolute fill capacity comprises empty; and
    proximate absolute fill capacity comprises approximately empty.

15. The method of claim 11, further comprising:
    receiving an enable request during said monitoring step.

16. A system for transferring data between two devices using a first-in, first-out data buffer having associated therewith at least one pointer, comprising:
    a plurality of flag registers for indicating buffer capacity status;
    a plurality of counter blocks for sequentially tracking pointer positions; and
    a comparator circuit for comparing information from said counter blocks and said flag registers and providing a data transfer indication under predetermined conditions.

17. The system of claim 16, wherein said flag registers comprise gray counters.

18. The system of claim 16, wherein said flag registers comprise a full flag register and an empty flag register.

19. The system of claim 18, wherein said data transfer comprises a write instruction and said predetermined condition comprises the full flag register not set high.

20. The system of claim 18, wherein said data transfer comprises a read instruction and said predetermined condition comprises the empty flag register not set high.

21. The system of claim 16, wherein said data blocks comprise:
- one block tracking said pointer; and
- the remaining blocks tracking at predetermined time periods relative to said pointer.

22. The system of claim 16, further comprising:
- a clock connected to said counter blocks and said flag registers.

23. The system of claim 22, wherein:
- said counter blocks comprise read counter blocks;
- said flag registers comprise an empty flag register and an almost empty flag register; and
- said clock comprises a read clock.

24. The system of claim 16, wherein said data buffer operates to transfer data between two asynchronous devices.

25. A system for transferring data into and out of a first-in, first-out data buffer having at least one buffer pointer associated therewith, comprising:
- a comparator circuit;
- a plurality of counter blocks for tracking pointer positions wherein said counter blocks comprise a plurality of read counter blocks and a plurality of write counter blocks; and
- a plurality of flag registers indicating relative buffer capacity wherein said plurality of flag registers comprise a full flag register, an almost full flag register, an almost empty flag register, and an empty flag register;
- wherein said comparator circuit evaluates said counter blocks and said flag registers to determine the ability of the buffer to accept or transmit data.

* * * * *